United States Patent
Souri et al.

(10) Patent No.: US 10,691,417 B2
(45) Date of Patent: *Jun. 23, 2020

(54) SYSTEM AND METHOD FOR EXECUTING NATIVE CLIENT CODE IN A STORAGE DEVICE

(71) Applicant: NGD SYSTEMS, INC., Irvine, CA (US)

(72) Inventors: Kamyar Souri, San Jose, CA (US); Joao Alcantara, Irvine, CA (US); Ricardo Cassia, Rancho Santa Margarita, CA (US)

(73) Assignee: NGD SYSTEMS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,232

(22) Filed: Nov. 16, 2018

(65) Prior Publication Data

US 2019/0087159 A1    Mar. 21, 2019

Related U.S. Application Data

(63) Continuation of application No. 14/561,724, filed on Dec. 5, 2014, now Pat. No. 10,168,997.

(Continued)

(51) Int. Cl.
| | |
|---|---|
| *G06F 9/44* | (2018.01) |
| *G06F 8/00* | (2018.01) |
| *H04L 12/861* | (2013.01) |
| *H04L 12/46* | (2006.01) |
| *G06F 13/10* | (2006.01) |
| *G06F 9/455* | (2018.01) |
| *G06F 21/53* | (2013.01) |
| *G06F 21/79* | (2013.01) |

(52) U.S. Cl.
CPC ............ *G06F 8/00* (2013.01); *G06F 9/45504* (2013.01); *G06F 13/10* (2013.01); *G06F 21/53* (2013.01);

(Continued)

(58) Field of Classification Search
CPC .......... G06F 8/00; G06F 9/20; G06F 9/45504; G06F 9/44; G06F 9/50; G06F 11/36; G06F 21/79; G06F 21/53
See application file for complete search history.

(56) References Cited

U.S. PATENT DOCUMENTS 6,393,540 B1 * 5/2002 Blumenau ............... G06F 3/061
                                                              711/165
8,959,067 B1    2/2015 Patiejunas et al.
(Continued)

OTHER PUBLICATIONS

Ding et al., Multicore-Enabled Smart Storage for Clusters, 2012 IEEE International Conference on Cluster Computing, pp. 108-116 (Year 2012).

(Continued)

*Primary Examiner* — Lewis A Bullock, Jr.
*Assistant Examiner* — Tina Huynh
(74) *Attorney, Agent, or Firm* — Lewis Roca Rothgerber Christie LLP

(57) ABSTRACT

A system and method for executing user-provided code securely on a solid state drive (SSD) to perform data processing on the SSD. In one embodiment, a user uses a security-oriented cross-compiler to compile user-provided source code for a data processing task on a host computer containing, or otherwise connected to, an SSD. The resulting binary is combined with lists of input and output file identifiers and sent to the SSD. A central processing unit (CPU) on the SSD extracts the binary and the lists of file identifiers. The CPU obtains from the host file system the addresses of storage areas in the SSD containing the data in the input files, reads the input data, executes the binary using a container, and writes the results of the data processing task back to the SSD, in areas corresponding to the output file identifiers.

14 Claims, 6 Drawing Sheets

Related U.S. Application Data

(60) Provisional application No. 62/017,623, filed on Jun. 26, 2014.

(52) U.S. Cl.
CPC .......... *G06F 21/79* (2013.01); *H04L 12/4633* (2013.01); *H04L 49/9078* (2013.01)

(56) References Cited

U.S. PATENT DOCUMENTS

| | | | |
|---|---|---|---|
| 9,122,690 B1* | 9/2015 | Chen | ................. G06F 3/067 |
| 2002/0002661 A1* | 1/2002 | Blumenau | ............... G06F 3/061 |
| | | | 711/165 |
| 2008/0016266 A1 | 1/2008 | Liu | |
| 2009/0276771 A1 | 11/2009 | Nickolov et al. | |
| 2014/0032691 A1 | 1/2014 | Barton et al. | |
| 2015/0358411 A1 | 12/2015 | Kruglick | |

OTHER PUBLICATIONS

Coughlin, A Fusion of Storage and Processing, Nov. 30, 2015 Forbes/Tech, 3 sheets (Year 2015).

Yee et al., "Native Client: A Sandbox for Portable, Untrusted x86 Native Code," IEEE Symposium on Security and Privacy, 15 pages, 2009.

http://www.zerovm.org/principles/html, "The Principles Behind ZeroVM," 1 page, Dec. 17, 2014.

* cited by examiner

SYSTEM AND METHOD FOR EXECUTING NATIVE CLIENT CODE IN A STORAGE DEVICE

CROSS-REFERENCE TO RELATED APPLICATION(S)

The present application is a continuation of U.S. application Ser. No. 14/561,724, filed on Dec. 5, 2014, now U.S. Pat. No. 10,168,997, which claims priority to and the benefit of U.S. Provisional Application No. 62/017,623, filed Jun. 26, 2014, entitled "SYSTEM AND METHOD FOR EXECUTING NATIVE CLIENT CODE IN A STORAGE DEVICE", the entire contents of which are incorporated herein by reference.

The present application is related to U.S. Pat. No. 8,819,335, entitled "SYSTEM AND METHOD FOR EXECUTING MAP-REDUCE TASKS IN A STORAGE DEVICE", the entire content of which is incorporated herein by reference.

FIELD

The following description relates to storage devices and more particularly to a system and method for executing user-provided data processing code on a storage device.

BACKGROUND

Data processing tasks, such as searching a collection of files for a string or pattern, may require access to large volumes of data. When conducted by a host computer, reading the data from a storage device over a storage interface, the operation can be slow, may burden the host central processing unit (CPU), and may consume a significant amount of power.

Thus, there is a need for a more resource-efficient system and method for conducting data processing tasks.

SUMMARY

Aspects of embodiments of the present disclosure are directed toward a system and method for executing user-provided code securely on a solid state drive (SSD) to perform data processing on the SSD. In one embodiment a user utilizes a security-oriented cross-compiler to compile user-provided source code for a data processing task on a host computer containing, or otherwise connected to, an SSD. The resulting binary is combined with lists of input and output file identifiers and sent to the SSD. A central processing unit (CPU) on the SSD extracts the binary and the lists of file identifiers. The CPU obtains from the host file system the addresses of storage areas in the SSD containing the data in the input files, reads the input data, executes the binary, using a container, and writes the results of the data processing task back to the SSD, in areas corresponding to the output file identifiers.

According to an embodiment of the present invention there is provided a storage device including: storage media; a device-side storage interface; a first processing unit; and a program memory storing instructions that, when executed by the processing unit, cause the processing unit to: instantiate a device data processing agent and a container, the device data processing agent being configured to: receive a first manifest including a first binary including first instructions, and transfer the first binary to the container.

In one embodiment, the container is configured to: validate the safety of the first instructions, and execute the first instructions when the first instructions are validated as safe.

In one embodiment, device data processing agent is further configured: to receive a second manifest including: a second binary; a plurality of input file identifiers; and a plurality of output file identifiers; and to send the plurality of input file identifiers and the plurality of output file identifiers through the storage interface; and to receive a plurality of block addresses through the storage interface, each block address identifying a storage area in the storage media, each block address corresponding to one of the plurality of input file identifiers and the plurality of output file identifiers.

In one embodiment, the second binary is the same as the first binary, and the second manifest is the same as the first manifest.

In one embodiment, the device data processing agent is further configured to retrieve data from the storage area identified by an address of the plurality of block addresses, and to transfer the retrieved data to the container.

In one embodiment, the address is a block address.

In one embodiment, the address is an object address.

In one embodiment, the device data processing agent is further configured to receive data from the container and to store the received data in a storage area identified by a block address of the plurality of block addresses.

In one embodiment, the storage device includes a second processing unit connected to a messaging interface, the second processing unit being configured to: receive, through the messaging interface, a data storage request including: a block address and data; and in response to the receiving of the data storage request, store the data in a storage area in the storage media.

In one embodiment, the second processing unit is further configured to: receive, through the messaging interface, a data retrieval request including a block address; in response to the receiving of the data retrieval request, retrieve data from a storage area in the storage media; and send the retrieved data through the messaging interface.

In one embodiment, the device data processing agent is configured to retrieve data from the storage area identified by a block address of the plurality of block addresses by sending a data retrieval request to the second processing unit through the messaging interface and receiving retrieved data through the messaging interface.

In one embodiment, the storage device includes a buffer to store data being sent to the second processing unit, and a circuit configured to interrupt the second processing unit when the buffer is not empty.

In one embodiment, the device data processing agent is further configured to: receive a third manifest including: a third binary including third instructions, and a fourth binary including fourth instructions, and transfer the third binary to the container when the third binary is suitable for execution by the first processing unit and, transfer the fourth binary to the container when the fourth binary is suitable for execution by the first processing unit.

In one embodiment, the third binary is the same as the first binary, and the third manifest is the same as the first manifest.

According to an embodiment of the present invention there is provided a method for operating a storage device, the storage device including: storage media; a device-side storage interface; and a first processing unit, the method including: instantiating, by the first processing unit, a device data processing agent and a container, receiving, by the device data processing agent, a manifest including one or more binaries, each of the one or more binaries including instructions, selecting, by the device data processing agent, a selected binary from the one or more binaries, the selected binary including selected instructions, and transferring, by the device data processing agent, the selected binary to the container.

In one embodiment, the method further includes: validating, by the container, the safety of the selected instructions, and executing the selected instructions when the selected instructions are validated as safe.

In one embodiment, the method includes: a plurality of input file identifiers; and a plurality of output file identifiers; and the method further includes: sending, by the device data processing agent, the plurality of input file identifiers and the plurality of output file identifiers through the storage interface; and receiving, by the device data processing agent, a plurality of block addresses through the storage interface, each block address identifying a storage area of the storage media.

In one embodiment, the method includes: receiving, through the storage interface, by a host data processing agent instantiated on a host system connected to the storage device by the storage interface, the plurality of input file identifiers and the plurality of output file identifiers, and sending, through the storage interface, by the host system, the plurality of block addresses.

In one embodiment, the sending of the plurality of input file identifiers and the plurality of output file identifiers, the receiving of a plurality of block addresses, the receiving of the plurality of input file identifiers and the plurality of output file identifiers, and the sending of a plurality of block addresses includes sending and receiving data through a virtual Transmission Control Protocol/Internet Protocol (TCP/IP) tunnel.

In one embodiment, the method includes: retrieving, by the device data processing agent, data from the storage area identified by a block address of the plurality of block addresses, and transferring, by the device data processing agent, the retrieved data to the container.

In one embodiment, the method includes: receiving data, by the device data processing agent, from the container; and storing, by the device data processing agent, the received data in a storage area identified by a block address of the plurality of block addresses.

In one embodiment, the one or more binaries include a first binary and a second binary of the one or more binaries, and the selecting of a selected binary from the one or more binaries includes: selecting, by the device data processing agent the first binary as the selected binary when the first binary is suitable for execution by the first processing unit, and selecting, by the device data processing agent the second binary as the selected binary when the second binary is suitable for execution by the first processing unit.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a system and method for executing native client code in a storage device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of the present invention provide a way to enable a solid-state drive (SSD) to execute software provided by a host for processing of user data stored in the SSD, enabling the SSD to run multiple instances of the data processing software at the same time, and enabling the SSD to execute the data processing software, which may be provided by a user, in a secure environment to prevent the software from accessing any unintended data or executing malicious code. Further, embodiments of the present invention enable existing application software, written to run on a host, to be executed on an SSD instead with only minor changes to the software. Embodiments of the present invention make it possible to run data processing applications written in different languages, such as C, C++, Python™, and Perl™, to be executed on an SSD. A cross compiler may be used on a host to compile the data processing software to be executed on an SSD in the host.

Figure 1:
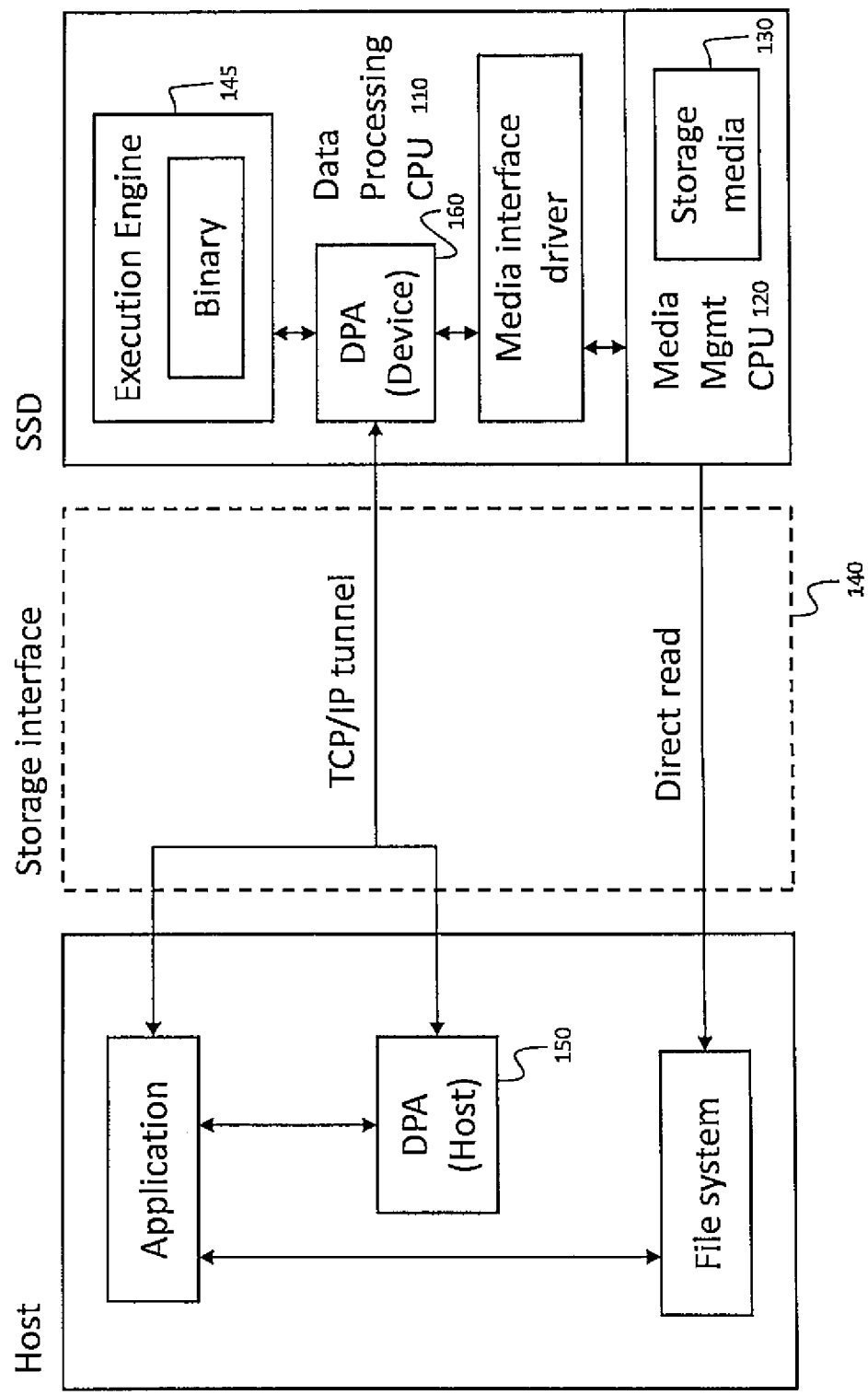
FIG. 1 is a block diagram of a host and a solid state drive (SSD) according to an embodiment of the present invention.

Referring to FIG. 1, in one embodiment, an SSD includes a data processing CPU 110 (e.g., a first CPU), a media management CPU 120 (e.g., a second CPU), and storage media, or "SSD media" 130, which may be one or more flash memories that may be collectively referred to as the flash memory. The SSD is connected to a host computer or "host", by a storage interface 140, which may, for example, be a Non Volatile Memory Express (NVMe) interface, a Peripheral Component Interconnect Express (PCIe) interface, or a Universal Serial Bus (USB) interface. In operation, the host may, instead of executing data processing code, provide a corresponding set of executable instructions, or "binary" to the SSD, which may execute the binary (i.e., execute the instructions in the binary) in the data processing CPU 110. The media management CPU 120 is dedicated to providing a flash translation layer and operating a flash management system. Although the example described above refers to a single data processing CPU 110 and a single media management CPU 120, there may be several data processing CPUs 110 or several media management CPUs 120, or several of each. Each CPU may have memory, which may be random access memory (RAM) (e.g., double data rate (DDR) memory), some or all of which may be shared with one or more other CPUs.

In one embodiment, the SSD uses a container 145, itself executing on the data processing CPU 110, to execute the binary. A container, as used herein, is any software module that manages the execution of a binary using sandboxing (i) to prevent the binary from interacting with any other software modules and (ii) to prevent the binary from interacting with any data that does not belong to the binary. A container may run in an OS and share that OS. Multiple containers may run in an OS. The container 145 may be a ZeroVM™ container, or a Linux LXC container. The container 145 creates a secure and isolated execution environment which can run an application and provides security infrastructure for limiting the data processing CPU 110's ability, when executing the binary, to access unintended data and/or execute malicious code. The ability to execute a host-supplied binary on the SSD allows users (e.g., developers) to push their data processing software to their data instead of having to pull their data to their data processing software, as would be the case if the host were executing the data processing software.

The container 145 provides an access mechanism referred to as "channels" for providing such access to external data. Requiring such access to be performed through channels allows the container 145 to prevent the binary from, e.g., causing the data processing CPU 110 to read from or write to files not associated with the binary (which malicious or erroneous code in the binary could attempt to access). In one embodiment, the container 145 validates the safety of the binary before beginning execution, by reviewing the binary for unsafe instructions or combinations of instructions, and proceeding with execution only if the binary is free of such unsafe instructions or combinations of instructions.

In operation, a user may generate a piece of data processing software, including source code, a list of input files, and a list of output files, for the purpose of searching or otherwise analyzing data stored on the SSD. In one embodiment, the user uses a virtualization package to generate the binary from the data processing software, and to combine the binary and a list of input and output file identifiers (e.g., file names) into a package referred to as a "manifest." These steps may be performed on the host or on a remote client system that communicates with the host. The virtualization package includes a security-oriented cross-compiler that compiles source code to form a safe binary, i.e., a binary that is safe for execution on the data processing CPU 110. The security-oriented cross-compiler ensures the safety of the binary by excluding from the binary certain instructions or patterns of instructions considered to present a risk of unacceptable execution behavior, such as a jump to a memory address not associated with the binary. In one embodiment the security-oriented cross-compiler is part of a Native Client™ tool chain, which in turn may be part of a ZeroVM™ virtualization package. In another embodiment, a generic compiler is used and Linux LXC is used as the container. The manifest is then sent to the SSD. In one embodiment it is sent to the SSD over a Transmission Control Protocol/Internet Protocol (TCP/IP) tunnel, discussed in further detail below.

In one embodiment two software modules, referred to as host data processing agent 150 ("DPA (Host)" in FIG. 1) and device data processing agent 160 ("DPA (Device)" in FIG. 1), execute on the host CPU and on the data processing CPU 110 respectively, to coordinate certain communications between the host and the SSD data processing CPU 110. The device data processing agent 160 executing on the SSD data processing CPU 110 receives the manifest from the host and extracts from the manifest the binary and the two lists of file identifiers. Although the input files are stored in the SSD storage media 130, the mapping between file identifiers (e.g., fife names) and the locations of storage areas (e.g., blocks) in the SSD media, which may be specified, e.g., as logical block addresses (LBAs) or object addresses, generally is not maintained by the SSD; instead, this mapping may be maintained by the host file system. The device data processing agent 160 therefore sends a request to the host data processing agent 150, requesting addresses (e.g., LBAs or object addresses) for the data in the files identified in the list of input file identifiers. The host data processing agent 150 then communicates the list of files to the host file system to get the list of addresses (e.g., LBAs), and the host data processing agent 150 then communicates the list of addresses back to the device data processing agent 160. As used herein, a device data processing agent is any software module that is configured (i) to form and send a request for a list of addresses corresponding to one or more file identifiers, (ii) to receive a list of addresses, (iii) to issue a request to read data from an address in the storage media and (iv) to issue a request to write data to an address in the storage media. As used herein, a host data processing agent is any software module configured to receive a request for a list of addresses corresponding to one or more file identifiers, and to provide, in response, the requested list of addresses.

The device data processing agent 160 on the SSD then issues read requests to the SSD media management CPU 120 (e.g., LBA read requests) to get the data required for processing. The media management CPU 120 reads the requested data, and the data is fed to the container (e.g., ZeroVM™) instance running the binary, and is processed. The result of the data processing, i.e., of the execution of the binary, using the requested data as input, is sent back to the device data processing agent 160, which sends it to the media management CPU 120 with a request to write it back to the storage media 130. This write request, or "data storage request", provides write addresses (e.g., LBAs) that were also obtained from the host data processing agent 150. The result of the data processing is then available in an output file on the SSD, and the host is able to retrieve the contents of the output file via direct SSD read access through the media management CPU 120.

In one embodiment the data processing software is compiled on the host. In other embodiments the data processing software may be compiled on another computer, e.g., a client computer geographically separated from the host and connected to the host. The computer used to compile the data processing software may not have the information needed to determine what kind of CPU the data processing CPU 110 is. In this case, the computer used to compile the data processing software may generate a plurality of binaries for various kinds of CPU architectures, and include all of them in the manifest. The data processing CPU 110 may then, upon receipt of the manifest, select from the plurality of binaries, one that is suitable for execution on the data processing CPU 110, and execute that binary.

Figure 2:
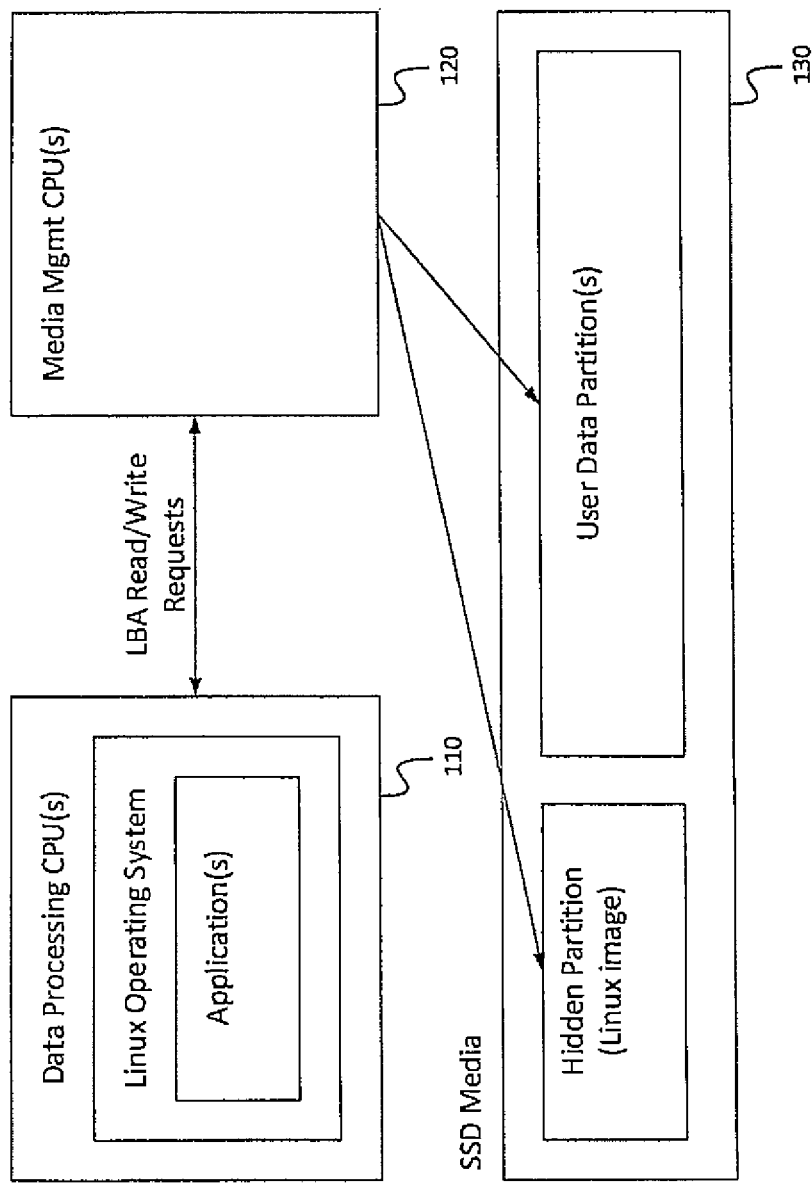
FIG. 2 is a block diagram of two central processing units (CPUs) and SSD media in an SSD according to an embodiment of the present invention.

Referring to FIG. 2, the data processing CPU 110, which may run a Linux™ operating system, may access blocks of data in the storage media 130 for two reasons: to load the Linux™ image from the storage media 130 to CPU memory, and to access user data, e.g., to fetch data from the storage media 130 for processing, and to write the output of the data processing task back to the storage media 130. The Linux™ operating system boot image may be located on a hidden partition on the SSD which is visible to the data processing CPU 110 as the main partition. To access the data in the storage media, the data processing CPU 110 may send read or write requests, to the media management CPU 120, to read or write blocks of data, identifying these blocks of data using logical block addresses (LBAs). The accessing of data in the storage media 130 by LBA may be referred to as "LBA access" of the data in the storage media 130.

The data processing CPU 110 and media management CPU 120 may interface with each other through a messaging interface which may be a firmware- or hardware-based path, which enables the data processing CPU 110 to read and write data from SSD media. As used herein, a "messaging interface" is any system by which one processing unit (e.g., a CPU) may send messages to another processing unit (e.g., another CPU).

Figure 3:
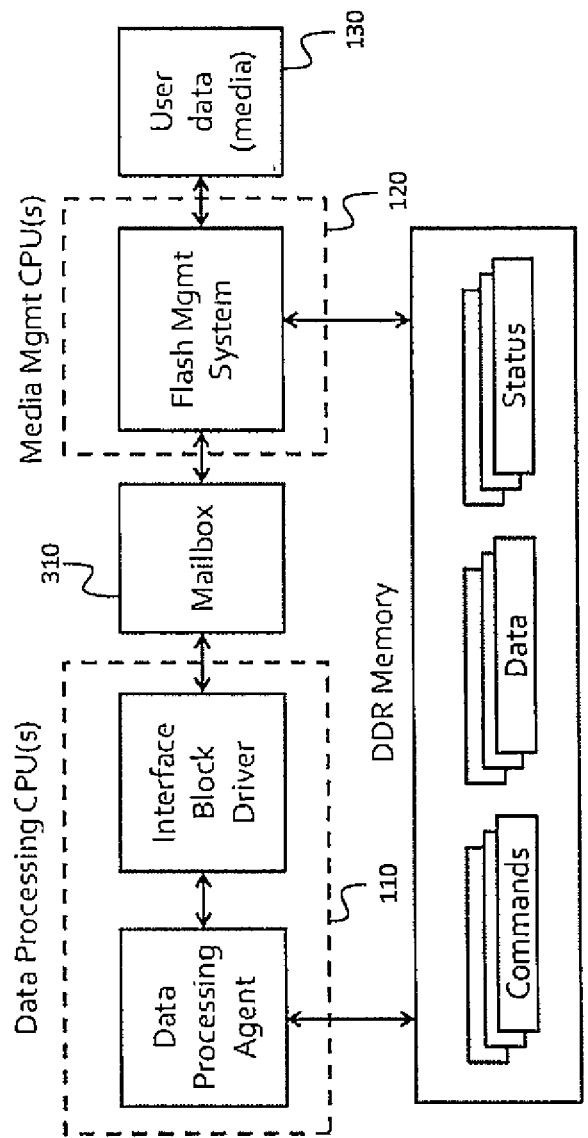
FIG. 3 is a block diagram of two central processing units (CPUs) in an SSD configured to communicate through a hardware mailbox according to an embodiment of the present invention.

Referring to FIG. 3, in one embodiment, a media management CPU 120 communicates with a data processing CPU 110 through a messaging interface referred to as a hardware mailbox 310, using a piece of mailbox driver firmware and a storage driver. The mailbox driver firmware runs on the media management CPU 120 and acts as a bridge between the mailbox and media management CPU 120. The storage driver may be an NVMe Linux™ driver which runs on the data processing CPU 110 and acts as a bridge between the Linux™ operating system (OS) and the mailbox hardware. The storage driver translates the LBA read/write requests and other NVMe media or administration commands into mailbox packets and passes the packets to the media management CPU 120. The mailbox driver firmware running on the media management CPU 120 then translates the mailbox packets into media or administrative commands and passes them to the flash management system. The flash management system is a software interface, executing on the media management CPU 120, that provides an interface to the flash memory. After completing a command or request sent by the data processing CPU 110 to the media management CPU 120, the media management CPU 120 sends the response back to data processing CPU 110 through the hardware mailbox 310. In one embodiment, the hardware mailbox 310 has a first buffer for messages being sent to the media management CPU 120, and a first circuit for generating an interrupt, to interrupt the media management CPU 120, when there is a message in the first buffer. Similarly, the hardware mailbox 310 may have a second buffer for messages being sent to the data processing CPU 110, and a second circuit for generating an interrupt, to interrupt the data processing CPU 110, when there is a message in the second buffer. The media management CPU 120 and the data processing CPU 110 may also have a shared memory, which they may use to share data/status related to each command or request.

Figure 4:
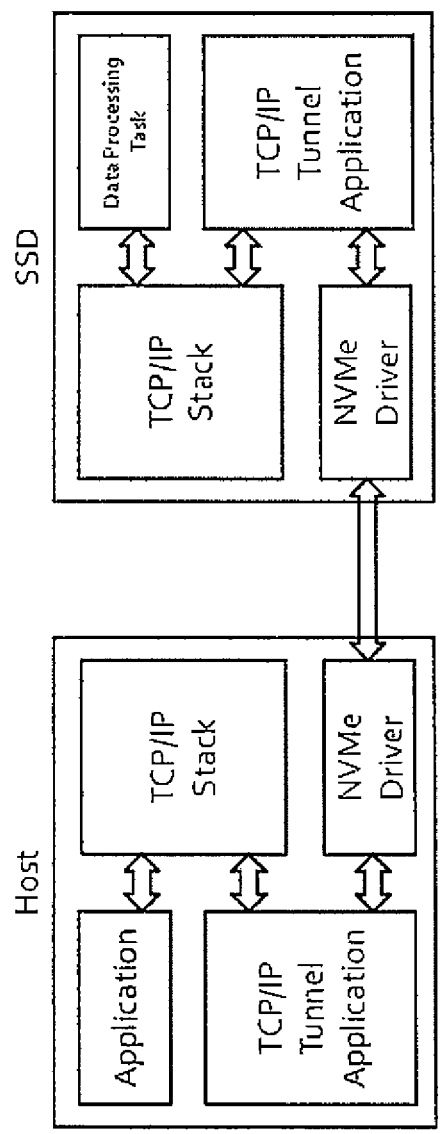
FIG. 4 is a block diagram of a host and an SSD configured to communicate through a virtual Transmission Control Protocol/Internet Protocol (TCP/IP) tunnel according to an embodiment of the present invention.

Referring to FIG. 4, in one embodiment, applications running on the host (e.g., the host data processing agent 150) communicate with applications (e.g., the device data processing agent 160) running on the data processing CPU 110 using virtual TCP/IP tunnels. Such tunnels enable other TCP/IP-based communication technologies like Berkeley sockets, File Transfer Protocol (FTP), Secure Shell (SSH), Virtual Private Networks (VPN), and the like to work without modification. In one embodiment, a virtual TCP/IP tunnel is created over an NVMe interface connecting the host and the SSD.

The creation of virtual TCP/IP tunnels may be enabled by adding two vendor-unique or "vendor-specific" commands (VSCs) to the storage interface (e.g., NVMe) command set. These two vendor-unique commands are used to (i) transfer one piece of data from host memory to SSD memory as an NVMe packet, and (ii) transfer one piece of data from SSD memory to host memory as an NVMe packet. Both the OS running on the host and the operating system (e.g., Linux™) running on the data processing CPU 110 may provide virtual TCP/IP tunneling, which is used to establish a TCP/IP connection over a physical layer other than Ethernet. This feature may be used on both the host and the SSD to tap into the IP path in the operating system kernel and pass IP packets over the storage interface 140 (e.g., an NVMe interface) using the above-mentioned vendor-unique commands.

Figure 5:
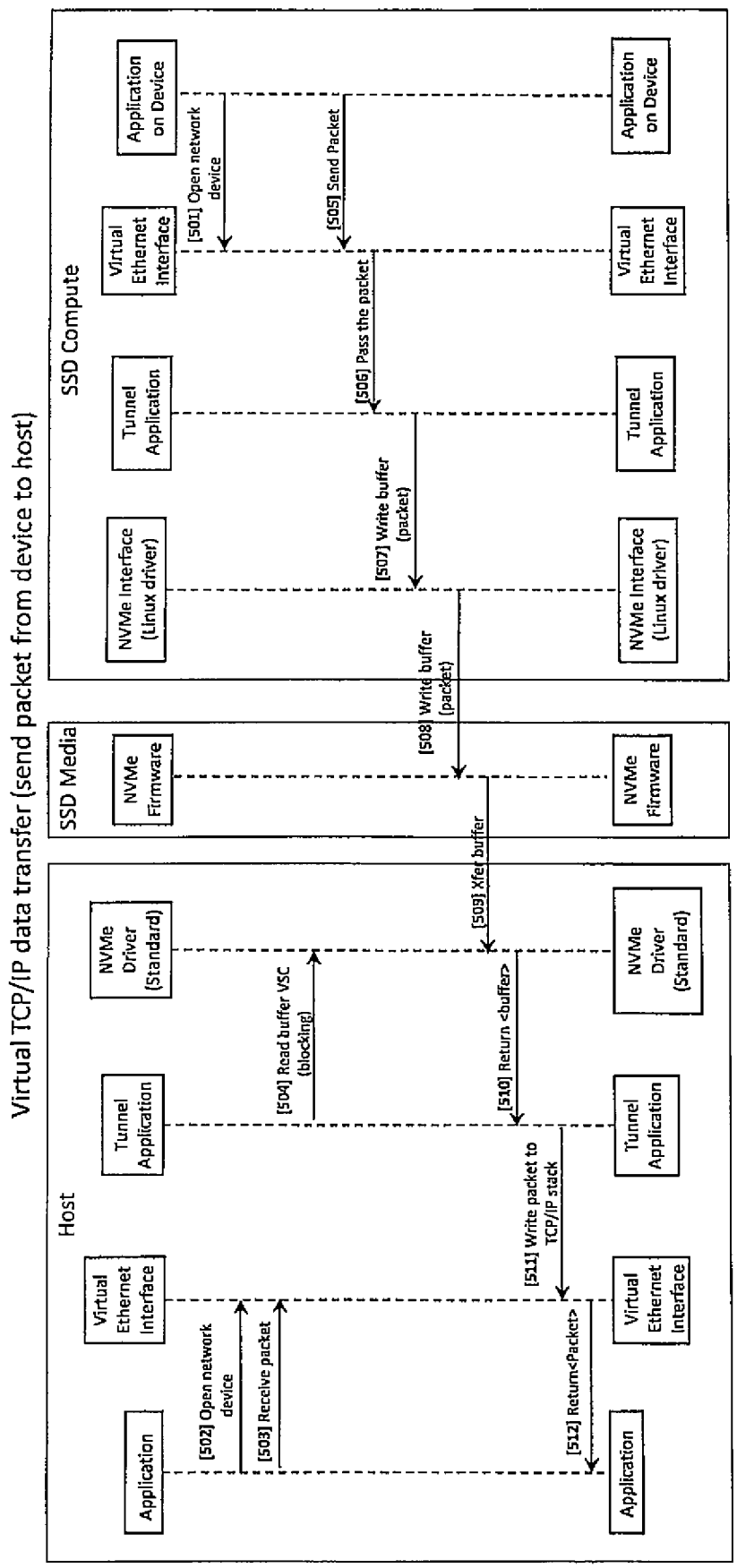
FIG. 5 is a time sequence diagram of a data transfer from an SSD to a host according to an embodiment of the present invention.

Referring to FIG. 5, in one embodiment a data transfer from the SSD to the host over a virtual TCP/IP tunnel proceeds as follows. In an act 501, an application executing on the SSD opens a network device in the virtual Ethernet interface provided by the virtual TCP/IP tunnel. In an act 502, an application executing on the host opens a network device in the virtual Ethernet interface provided by the virtual TCP/IP tunnel. In an act 503, the application executing on the host makes a call on the virtual Ethernet interface, requesting to receive a packet. In an act 504, a tunnel application on the host executes a blocking call to a function in the storage interface (e.g., NVMe) driver which generates a vendor-specific "read buffer" command (i.e., a VSC). In an act 505, the application executing on the SSD sends a packet through the virtual Ethernet interface, and, in an act 506, the virtual Ethernet interface passes the packet to the tunnel application on the SSD which, in an act 507, executes a write buffer call in the storage interface (e.g., NVMe) driver. The storage interface (e.g., NVMe) driver then, in an act 508, executes a write buffer command on the storage interface (e.g., NVMe) firmware, which then, in an act 509, transfers the buffer to the storage interface (e.g., NVMe) driver in the host. The storage interface (e.g., NVMe) driver causes, in an act 510, the function call made in act 504 to return, with the value of the packet. The tunnel application, in an act 511, writes the packet to the TCP/IP stack, and in an act 512, the virtual Ethernet interface delivers the IP packet to the application executing on the host.

Figure 6:
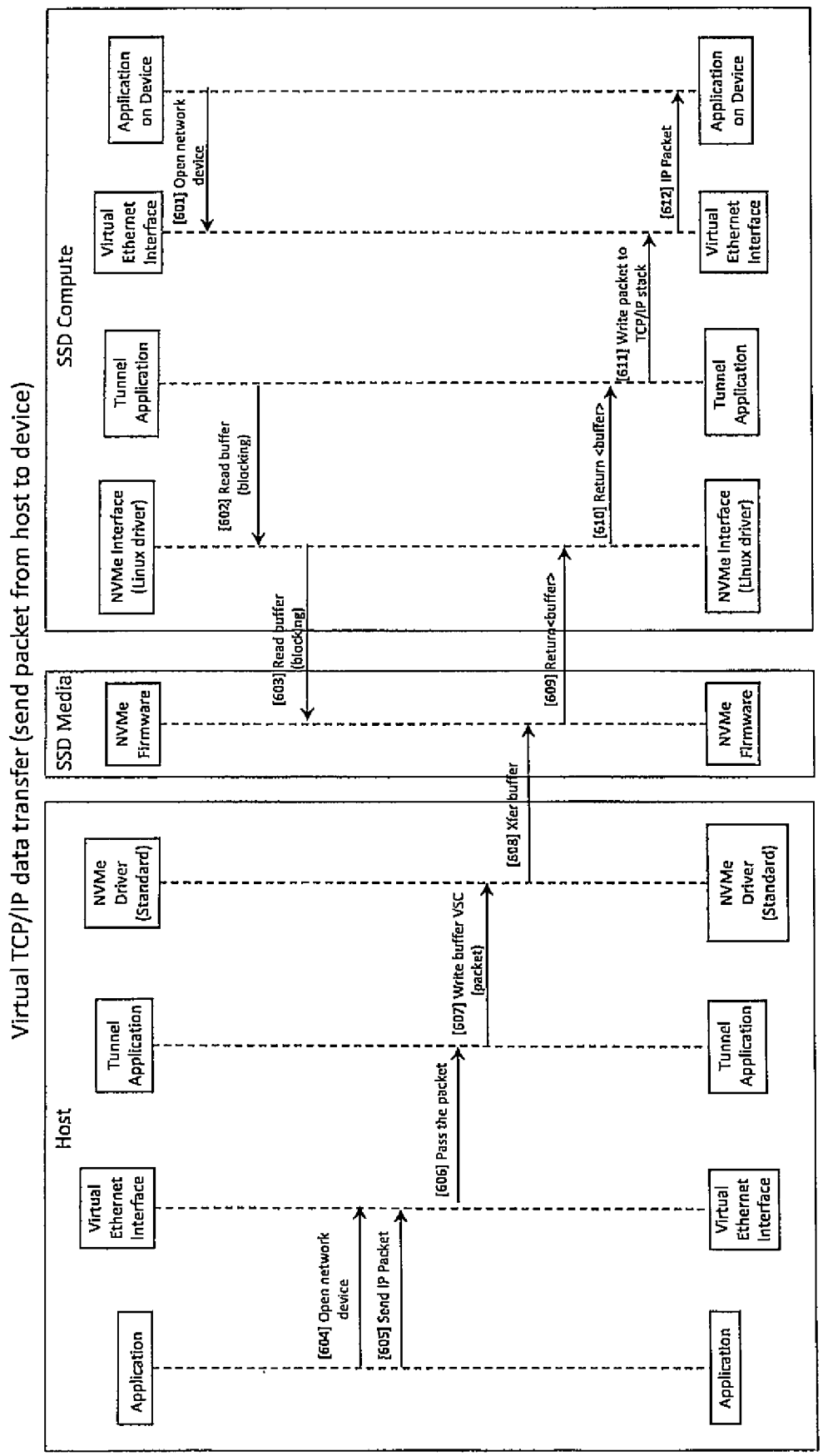
FIG. 6 is a time sequence diagram of a data transfer from a host to an SSD according to an embodiment of the present invention.

Referring to FIG. 6, in one embodiment a data transfer from the host to the SSD over a virtual TCP/IP tunnel proceeds as follows. In an act 601, an application executing on the SSD opens a network device in the virtual Ethernet interface provided by the virtual TCP/IP tunnel. In an act 602, a tunnel application on the SSD executes a blocking read buffer call to a function in the storage interface (e.g., NVMe) driver, and, in an act 603, the storage interface (e.g., NVMe) driver then executes a blocking read buffer call to a function in the storage interface (e.g., NVMe) firmware. In an act 604, an application executing on the host opens a network device in the virtual Ethernet interface provided by the virtual TCP/IP tunnel. In an act 605, the application sends an IP packet through the virtual Ethernet interface. In an act 606, the virtual Ethernet interface passes the packet to the tunnel application, which, in an act 607, executes a vendor-specific command (VSC), which is a "write buffer" command, to the storage interface (e.g., NVMe) driver, which then, in an act 608, transfers the buffer to the storage interface (e.g., NVMe) firmware. In an act 609, the storage interface (e.g., NVMe) firmware causes the function calf made in act 603 to return, with the value of the packet received through the buffer. The storage interface (e.g., NVMe) driver then causes, in an act 610, the function call made in act 602 to return, with the value of the packet. The tunnel application, in an act 611, writes the packet to the TCP/IP stack, and in an act 612, the virtual Ethernet interface delivers the IP packet to the application executing on the SSD.

A "storage interface", as used herein, refers to one of a class of physical interfaces customarily used to connect a host device to a storage device such as an SSD. Such interfaces may have two sides, one interface customarily included in the host, and one customarily included in the storage device, e.g., in the SSD. As used herein, a "device-side storage interface" falls into the latter category, and in particular, a "device-side storage interface" is an interface selected from the group consisting of a device-side Non Volatile Memory Express (NVMe) interface, a device-side Peripheral Component Interconnect Express (PCIe) interface, a device-side Universal Serial Bus (USB) interface, a device-side serial AT attachment (SATA) interface, a device-side parallel AT attachment (PATA) interface, and a device-side compact flash (CF) interface.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Elements of embodiments of the present invention may be implemented using one or more processing units. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed circuit board (PCB) or distributed over several interconnected PCBs. A processing unit may contain other processing units; for example, a processing unit may include two processing units, an FPGA and a CPU, interconnected on a PCB.

Although exemplary embodiments of a system and method for executing native client code in a storage device have been specifically described and illustrated herein, many modifications and variations will be apparent to those skilled in the art. For example, although embodiments herein have been described as involving an SSD, other embodiments may utilize other kinds of storage device, such as a hard disk drive or tape drive, which may utilize storage media other than flash memories. Thus, as used herein, "storage media" refers to a part or to several parts suitable for storing data (e.g., one or more flash memories, one or more hard disk platters, or one or more tapes). Accordingly, it is to be understood that a system and method for executing native client code in a storage device constructed according to principles of this invention may be embodied other than as specifically described herein. The invention is also defined in the following claims, and equivalents thereof.

What is claimed is:

1. A storage device communicatively coupled to a host through a storage interface, the storage device being configured to store host data provided by the host through the storage interface, the storage device comprising:
   storage media;
   a first processing unit; and
   a program memory storing instructions that, when executed by the first processing unit, cause the first processing unit to:
      instantiate, within the storage device, a device data processing agent and a container, wherein the device data processing agent is connected to the host through a virtual Transmission Control Protocol/Internet Protocol (TCP/IP) tunnel over the storage interface, and wherein the device data processing agent is configured to receive, from the host through the virtual TCP/IP tunnel over the storage interface, a first manifest comprising a first binary comprising first instructions;
      extract the first binary, from the first manifest, within the storage device; and
      execute the first binary to perform data processing on data stored in the storage device based on the first instructions in the first binary.

2. The storage device of claim 1, wherein the container is configured to:
   validate a safety of the first instructions, and
   execute the first instructions when the first instructions are validated as safe.

3. The storage device of claim 1, wherein the device data processing agent is further configured to receive data from the container and to store the received data in a storage area identified by a block address of a plurality of block addresses.

4. The storage device of claim 3, further comprising a second processing unit connected to a messaging interface, the second processing unit being configured to:
   receive, through the messaging interface, a data storage request comprising:
      a block address and
      data; and
   in response to the receiving of the data storage request, store the data in a storage area in the storage media.

5. The storage device of claim 4, wherein the second processing unit is further configured to:
   receive, through the messaging interface, a data retrieval request comprising a block address;
   in response to the receiving of the data retrieval request, retrieve data from a storage area in the storage media; and
   send the retrieved data through the messaging interface.

6. The storage device of claim 5, wherein the device data processing agent is configured to retrieve data from the storage area identified by a block address of the plurality of block addresses by sending a data retrieval request to the second processing unit through the messaging interface and receiving retrieved data through the messaging interface.

7. The storage device of claim 6, wherein the messaging interface is a hardware mailbox connected to the first processing unit and the second processing unit, the hardware mailbox comprising a buffer to store data being sent to the second processing unit, and a circuit configured to interrupt the second processing unit when the buffer is not empty.

8. The storage device of claim 7, wherein the first manifest further comprises a second binary comprising second instructions, and
   wherein the device data processing agent is further configured to:
      transfer the first binary to the container when the first binary is suitable for execution by the first processing unit, and
      transfer the second binary to the container when the second binary is suitable for execution by the first processing unit.

9. A method for operating a storage device communicatively coupled to a host through a storage interface, the storage device being configured to store host data provided by the host through a virtual Transmission Control Protocol/Internet Protocol (TCP/IP) tunnel over the storage interface, the storage device comprising:
   storage media; and
   a first processing unit,
   the method comprising:
   instantiating, by the first processing unit through the virtual TCP/IP tunnel over the storage interface, within the storage device, a device data processing agent and a container,
   receiving, by the device data processing agent through the virtual TCP/IP tunnel over the storage interface, a manifest from the host, the manifest comprising one or more binaries, each of the one or more binaries comprising instructions,
   selecting, by the device data processing agent, a selected binary from the one or more binaries, the selected binary comprising selected instructions,
   extracting the selected binary, from the manifest, within the storage device, and
   executing the selected binary by the first processing unit to perform data processing on data stored in the storage device based on the selected instructions in the selected binary.

10. The method of claim 9, wherein the method further comprises:
   validating, by the container, a safety of the selected instructions, and
   executing the selected instructions when the selected instructions are validated as safe.

11. The method of claim 10, wherein the receiving, by the device data processing agent, of the manifest comprises receiving, by the device data processing agent, the manifest comprising:
   a plurality of input file identifiers; and
   a plurality of output file identifiers, and
   the method further comprises:
   sending, by the device data processing agent, a request to the host in the form of the plurality of input file identifiers and the plurality of output file identifiers through the storage interface; and
   receiving, by the device data processing agent, a corresponding response from the host in the form of a plurality of block addresses through the storage interface, each block address identifying a storage area of the storage media.

12. The method of claim 11, further comprising:
   retrieving, by the device data processing agent, data from the storage area identified by a block address of the plurality of block addresses, and
   transferring, by the device data processing agent, the retrieved data to the container.

13. The method of claim 11, further comprising:
   receiving data, by the device data processing agent, from the container; and
   storing, by the device data processing agent, the received data in a storage area identified by a block address of the plurality of block addresses.

14. The method of claim 9, wherein:
   the one or more binaries comprise a first binary and a second binary of the one or more binaries, and
   the selecting of a selected binary from the one or more binaries comprises:
      selecting, by the device data processing agent, the first binary as the selected binary when the first binary is suitable for execution by the first processing unit, and
      selecting, by the device data processing agent, the second binary as the selected binary when the second binary is suitable for execution by the first processing unit.

* * * * *